Figure 1:
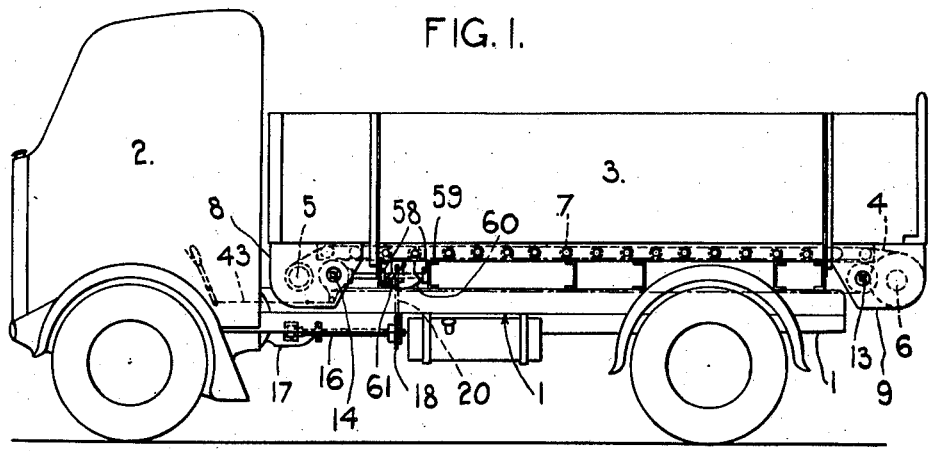

Sept. 13, 1938.   H. W. SWIFT   2,129,796

MOVING FLOOR FOR VEHICLES

Filed May 12, 1937   3 Sheets-Sheet 1

Inventor
H. W. Swift
by Ernest F. Muchlin
Attorney

Sept. 13, 1938. H. W. SWIFT 2,129,796
MOVING FLOOR FOR VEHICLES
Filed May 12, 1937  3 Sheets-Sheet 2

Inventor
H. W. Swift
by Ernest S. Mechlin
Attorney

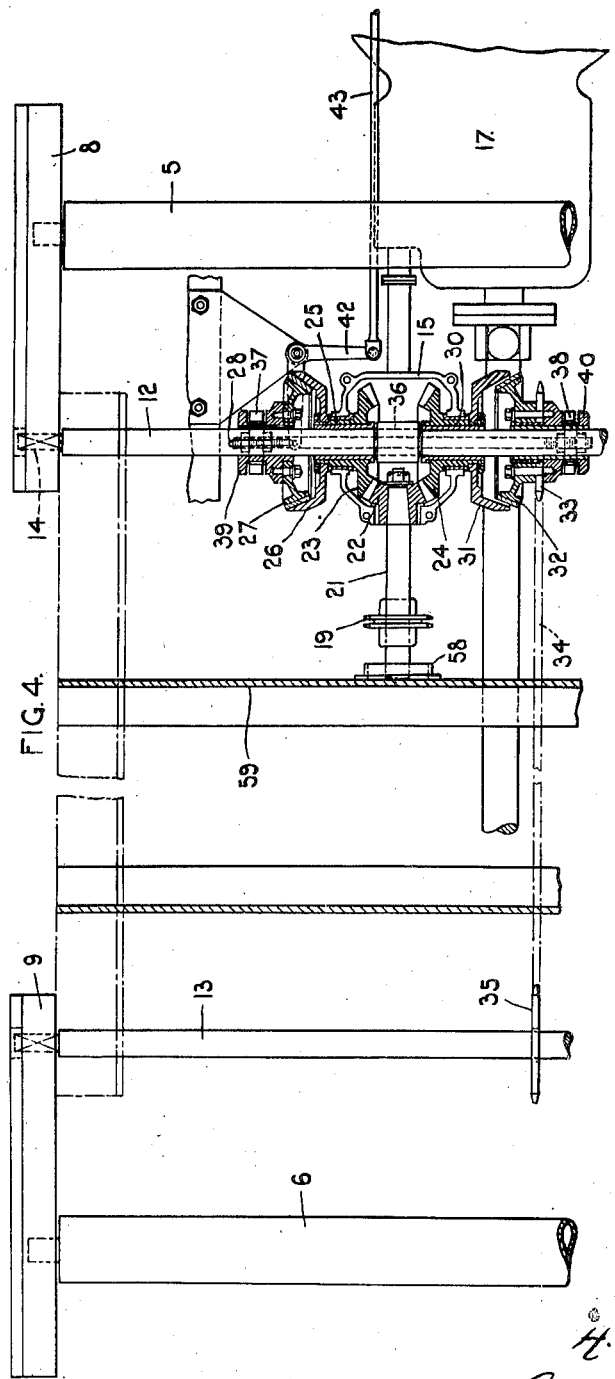

Patented Sept. 13, 1938

2,129,796

UNITED STATES PATENT OFFICE 2,129,796

MOVING FLOOR FOR VEHICLES

Herbert Wilson Swift, Bolton, England, assignor to Bromilow & Edwards Limited, Bolton, England Application May 12, 1937, Serial No. 142,261
In Great Britain December 15, 1936

5 Claims. (Cl. 214—83)

This invention relates to moving floors for vehicles such as motor lorries and the like with more especial reference to those in which a band of flexible material has its ends secured to drums or rollers at each end or side of the vehicle body and is supported throughout its length by freely rotatable rollers.

A moving floor for vehicles of this character is described in patent specification No. 1,970,899, the intermediate rollers supporting the band being arranged in parallel rows with the rollers of each row staggered in relation to the rollers of adjacent rows and the end drums by which movement of the floor is effected are furnished at each side with operating gear boxes each including a reduction train, these gear boxes being located at the ends of the vehicle body and the front gear box being operated to load the vehicle by winding the flexible band forwardly, while to discharge the contents of the vehicle the rear gear box is operated, thus effecting a rearward movement of the flexible band.

Under many conditions of use, for instance, when discharging over a quay side or river bank over which the tail of the vehicle body projects, difficulty may be experienced in operating the rear gear box owing to its inaccessibility, and the present invention has for one object to remove this disadvantage.

In accordance with the present invention the aforementioned gear boxes at each end of the moving floor or vehicle body are supplemented or replaced by a power driven gear box, preferably one driven by the motive unit of the vehicle and controllable to effect either forward movement of the moving floor for loading or rearward movement thereof for discharge.

Preferably, the power driven gear box is complementary to the end gear boxes of the moving floor and is selectively connectable to one or the other of them through the medium of clutches of any appropriate form controllable by the operator, it may be, from a position in the driving cab of the vehicle.

Advantageously the power shaft for operating the moving floor is an auxiliary shaft associated with the main vehicle gear box which may be of orthodox type equipped with auxiliary power take-off, a counter shaft parallel to the chassis frame and located under the body taking the drive to a pair of constant mesh bevels disposed within the operating gear box from which shafts project transversely of the vehicle. With each bevel there is associated a clutch and the respective clutches are connected one to the front end gear box of the moving floor, and the other to the rear end gear box of such floor so that on the operator coupling one or other clutch to the power take-off the floor is moved by the motive unit of the vehicle either forwardly for loading or rearwardly for discharge as desired.

In one embodiment of power actuated moving floor according to the present invention one of the clutches is connected directly by a transverse shaft to the front end gear box of the moving floor and the other clutch is connected through chain and sprocket wheels to the rear end gear box which is actuated for moving the floor rearwardly and discharging its contents.

The bevel housing or operating gear box has a transverse shaft running through it and bridging the front end gear boxes of the moving floor the driven member of the forward or loading clutch being keyed to this shaft so that on the clutch being closed the front gear box is operated to move the floor forwardly for loading. The driven member of the discharging clutch is furnished with a bush on the aforementioned transverse shaft and mounts a sprocket wheel conveying the drive via a chain to a second sprocket wheel fixed for rotation with a cross winding shaft bridging the rear end gear boxes in such manner that on the discharging clutch being closed the rear end drum of the moving floor is rotated and, drawing the flexible band rearwardly, discharges the contents of the floor.

The invention will be further described with reference to the accompanying explanatory drawings where one embodiment applied to a forward control motor vehicle is illustrated by way of example, and wherein,—

Fig. 1 shows diagrammatically in side elevation a motor vehicle equipped with the power driven moving floor.

Figure 2:
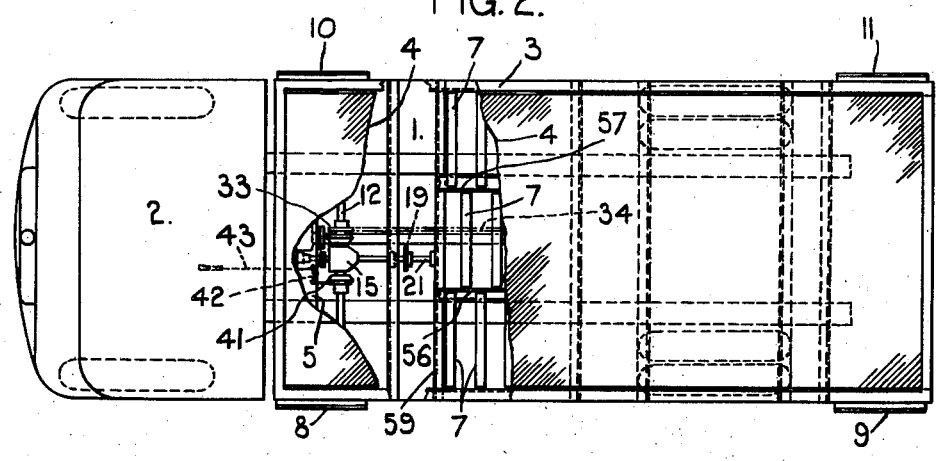

Fig. 2 being a plan thereof partly in section clearly to show the elements of the moving floor.

Figure 3:
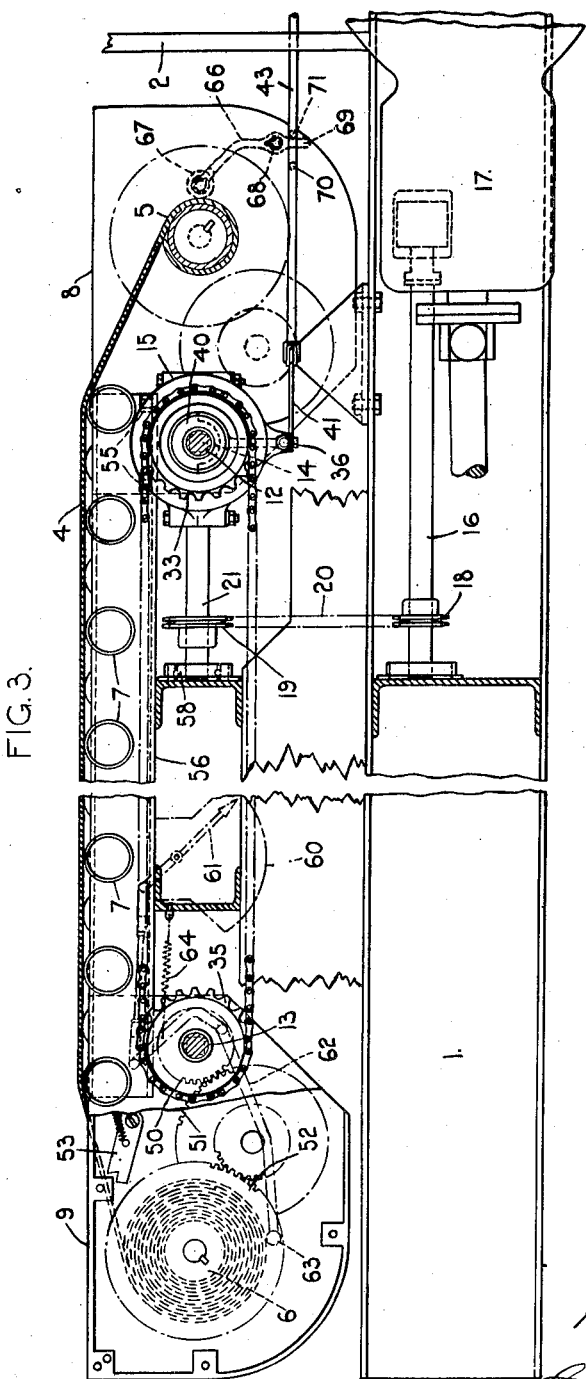

Figs. 3 and 4 are respectively a longitudinal vertical and a horizontal detail section to a larger scale of the power driven moving floor, the particular embodiment shown being one having staggered rollers in accordance with patent specification No. 1,970,899, aforementioned.

Referring now to the drawings, but first more particularly to Figs. 1 and 2, the motor vehicle generally designated 1 is of the now customary forward control type having a driver's cab 2 disposed over its front axle and rearwardly thereof a loading platform or body 3 equipped with a moving floor comprising a band of flexible material 4 having its ends secured to drums or rollers 5 and 6 at each end of the vehicle body.

The band 4 is supported throughout its length by freely rotatable rollers 7 and as more clearly shown in Figs. 2 and 4, these intermediate supporting rollers 7 are arranged in parallel rows with the rollers of each row staggered in relation to the rollers of adjacent rows in accordance with patent specification No. 1,970,899. The end drums 5 and 6 by which movement of the floor is effected are furnished with operating gear boxes, 8 for the front end drum 5, and 9 for the rear end drum 6 on the near side of the vehicle, corresponding dummy gear boxes 10 and 11 being positioned on the offside thereof.

As in the aforementioned patent specification cross shafts, 12 for the front gear boxes 8 and 10, and 13 for the rear gear boxes 9 and 11, are furnished by means of which the flexible band 4 may be moved forwardly when loading or rearwardly for discharge, the ends of such cross shafts 12 and 13 being squared as shown at 14 or otherwise formed for the attachment of an operating handle.

For power actuation there is furnished on the cross shaft 12 a distributing gear box 15 adapted to be driven by the engine of the vehicle 1 via a counter-shaft 16 connected to the auxiliary power take-off on the vehicle gear box 17, sprocket wheels 18 and 19 and a chain 20 connecting the countershaft 16 with a shaft 21 borne within the gear box 15 for rotation of such shafts in unison.

Referring now more particularly to Fig. 4, within the distributing gear box 15 the shaft 21 mounts a driving bevel 22 constantly enmeshed with driven bevel wheels 23 and 24 disposed coaxially on the cross shaft 12 at each side of the driving bevel 22 in such manner that on rotation of the latter they are driven in opposite directions as will be understood.

Associated with the bevel wheel 23 via a bush 25 is the driven portion 26 of a clutch hereafter referred to as a loading clutch, the other portion 27 whereof is slidable along but fixed for rotation with the shaft 12 by means of a key 28, and the arrangement being such that when the two portions 26 and 27 of the loading clutch are engaged, the flexible band 4 constituting the moving floor is moved forwardly for loading under the power of the engine driving through the auxiliary power take-off, shafts 16 and 21, and bevel wheels 22, 23 to rotate the shaft 12 in a direction to wind the flexible band on the front end drum 5.

Connected to the other bevel wheel 24 also through a bush designated 30 is the driving portion of a clutch 31 hereafter referred to as a discharging clutch, the driven portion 32 whereof carries a sprocket wheel 33 which, via a chain 34 extending longitudinally of the moving floor, is connected to a duplicate sprocket wheel 35 on the rear cross shaft 13.

For moving the flexible band 4 rearwardly to discharge the contents of the floor, the driving and driven portions 31 and 32 of the discharging clutch are engaged, whereat the sprocket wheel 33 is rotated from the engine of the vehicle in a direction opposite to that in which the shaft 12 was rotated for loading, and through the chain 34 and sprocket 35 rotates the rear cross shaft 13 so as to wind the flexible material on to the rear end drum 6.

For controlling the loading and discharging clutches, a selector shaft 36 borne by the distributing gear box 15 extends transversely underneath the cross shaft 12, yokes 37 and 38 extending upwardly from the selector shaft 36 and co-operating with collars 39 and 40 on the loading and discharging clutches respectively. A bell crank lever 41 is connected on the one hand to the selector shaft 13, and on the other hand at 42 to a link 43 passing forwardly to a lever or other device in the cabin of the vehicle.

By movement of the link 43 forwardly or rearwardly as the case may be from a neutral position, the selector rod 36 is moved transversely to engage the discharging clutch or the loading clutch as required.

Where desired, the cabin control may be replaced or supplemented by an extension of the selector shaft 36 to one or both sides of the vehicle whence it may be directly manipulated to its neutral, loading or discharge position.

For manual operation the front and rear end gear boxes 8 and 9 advantageously include reduction trains 50, 51 and 52 and a cut-out 53 for the idle gear box, e. g. the front gear box 8 when discharging, and the rear gear box 9 when loading, and, while the same reduction trains may be employed when the moving floor is power actuated, resort may be had to an equal ratio gear drive. The cut-out 53 when moved from the position shown in Fig. 3 to its operative position fixes the location of the intermediate shaft with its gears 51 enmeshed with the driving pinion 50 and with its reduction pinion enmeshed with the driven gear wheel 52 on the shaft 6.

The distributing gear box 15 may be borne by bolts 55 from one of the central longitudinal frame members 56, 57 of the moving floor structure, and the other end of the shaft 21 carried in an antifriction bearing 58 supported by one of the main cross bearers 59 bridging the chassis of the vehicle 1 and serving to carry the moving floor framework.

To prevent overwinding a visual indicator may be provided taking the form of a quadrant 60 having a pointer 61 associated with a lever 62 carrying a roller 63 urged by a spring 64 into contact with the portion of the belt wound on the end drum so that the varying diameter of the belt drum causes the pointer 61 to move across the indicator quadrant 60, and thereby show the operator when the belt is either fully wound or fully unwound. Such a visual indicator is diagrammatically shown associated with the rear end drum 6 illustrated on the left of Fig. 3.

Preferably, however, to prevent overwinding and remove any possibility of damaging the flexible band 4 or other component of the moving floor, provision is made automatically to open both the loading and discharging clutches after a predetermined number of revolutions, such provision being diagrammatically illustrated in association with the front end drum 5 in Fig. 3 and comprising a bell crank lever 66 bearing a roller 67 in contact with the portion of the belt 4 wound on the end drum 5, a spring 68 urging the lever 66 in a direction to maintain this contact and an extension or projection 69 on the lever co-operating with lugs or stops 70 and 71 on the clutch actuating link 43 so as to move the link forwardly to disengage the discharging clutch when the front end drum is completely unwound, and conversely, when the front end drum is fully wound to move the link 43 in a rearward direction thus to open the loading clutch.

The selector rod 36 or the link 43 may have an associated spring (not shown) for maintaining the clutch parts in their open or disengaged position except when actuated by the operator, and provision may also be made for holding the floor stationary when the control lever is in neutral position.

Moreover, it will be understood that although the embodiments of the invention illustrated show a construction of moving floor in accordance with patent specification No. 1,970,899 disposed on the vehicle for rear end discharge, the invention may equally well be applied to a moving floor transversely arranged for discharge at one or both sides of the vehicle and also with other constructions of moving floor employing a flexible band.

Finally, a reversible power take-off drive may be incorporated or associated with a moving floor driving mechanism, for instance, as an extension of the cross shaft 12, provision in this case being made for uncoupling the gear box 8 and for connecting one or other of the clutches to the shaft so that it may be run in one or other direction from the vehicle engine.

By the present invention an improved construction of moving floor for vehicles adapted for operation by the power unit under the control of the driver or operator to load the vehicle or discharge its contents is obtained.

What I claim is:—

1. A moving floor for vehicles comprising a band of flexible material having its ends secured to drums or rollers, independent operating gear boxes for such drums or rollers each including a reduction train, and a power driven gear box complementary to such end gear boxes and selectively connectable to one or other of them to impart movement of the floor respectively in one direction for loading or in the other direction for discharge.

2. A moving floor for vehicles according to claim 1, wherein the gear boxes include provision for manual operation through the reduction gear, each gear box being operative to move the floor in a direction towards the drum adjacent the particular gear box and not in the reverse direction.

3. A moving floor for vehicles according to the preceding claim 1, wherein the power driven gear box comprises a driving bevel and two constantly meshing and co-axially driven bevels with each of which is associated a clutch, the respective clutches being connected one to the front end drum of the floor via its gear box, and the other similarly to the rear end drum of the floor whereby on one or other clutch being coupled the floor is moved either forwardly for loading or rearwardly for discharge the gear box at the end from which the floor is moving remaining idle, whereby rucking of the flexible band is avoided.

4. A power driven moving floor according to the preceding claim 1, including means for preventing overwinding comprising a lever spring urged into contact with a portion of the belt wound on one end drum, and responsive to the varying thicknesses of this portion to control the power driven gear box with its loading and discharging clutches so as to open the loading clutch at the limit of loading movement, and similarly to open the discharging clutch at the limit of discharge movement.

5. A moving floor for engine driven vehicles comprising a band of flexible material having its ends secured to drums and supported throughout its length by freely rotating rollers, independent operating gear boxes for such drums, each including a reduction train, a power driven gear box, a longitudinal counter-shaft driven by the engine of the vehicle, a chain and sprocket connection between such counter-shaft and the power driven gear box, said power driven gear box being selectively connectable to one or other of the operating gear boxes to impart movement of the floor respectively in one direction for loading or in the other direction for discharge.

HERBERT WILSON SWIFT.